May 23, 1933.  A. BÜCHI  1,910,279
INTERNAL COMBUSTION ENGINE HAVING EXHAUST TURBINES AND COMPRESSORS
Filed Jan. 25, 1929   2 Sheets-Sheet 1
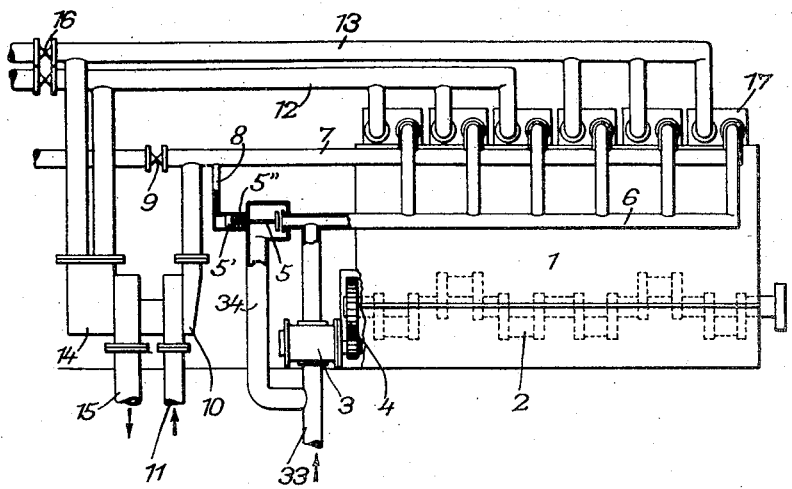
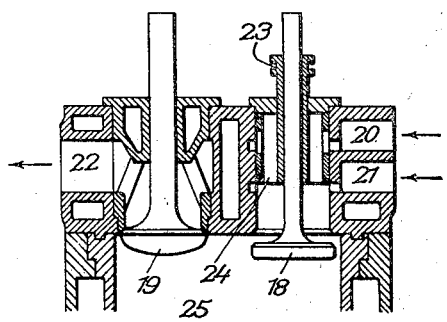
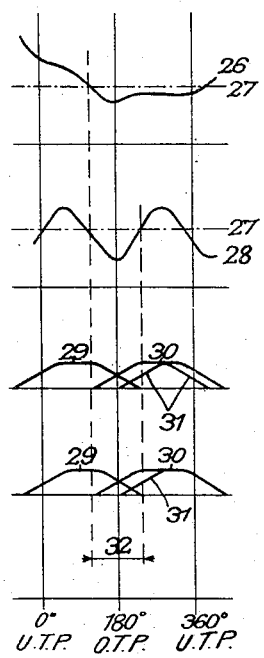
Inventor:
Alfred Büchi

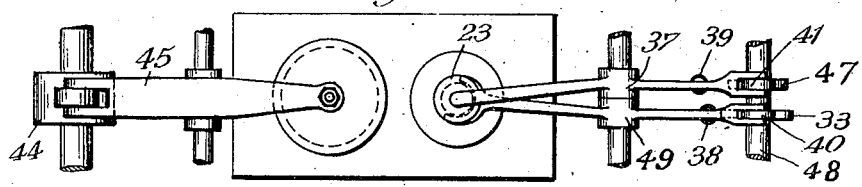
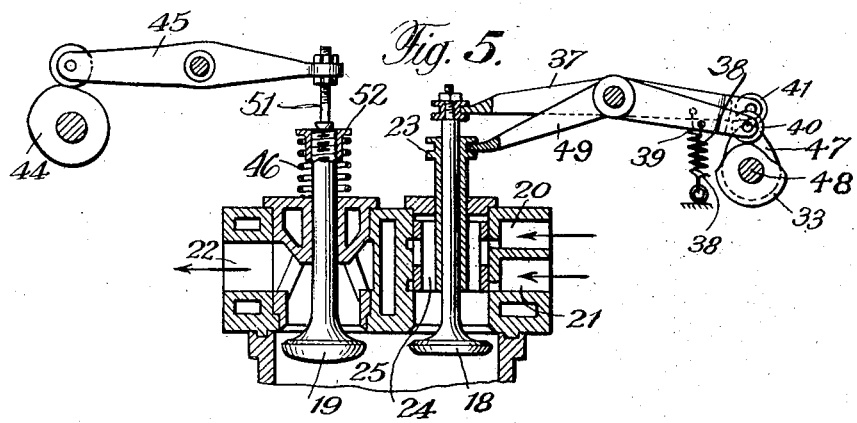
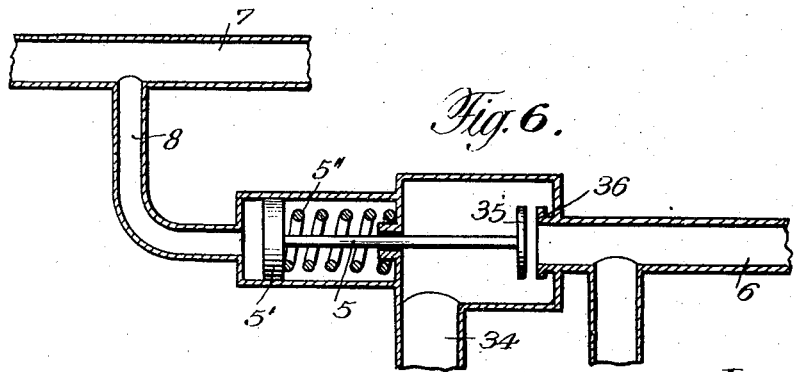

Patented May 23, 1933

1,910,279

UNITED STATES PATENT OFFICE

ALFRED BÜCHI, OF WINTERTHUR, SWITZERLAND

INTERNAL COMBUSTION ENGINE HAVING EXHAUST TURBINES AND COMPRESSORS

Application filed January 25, 1929, Serial No. 334,996, and in Switzerland February 5, 1928.

The present invention relates to internal combustion engines and particularly gas engines provided with exhaust turbines and compressors for pre-compressing the air for combustion purposes and the supplied gas. It consists in so designing the gas engines that on the one hand the air for combustion is compressed in a turbo-compressor driven by the exhaust turbine and on the other hand the gas is compressed by a compressor driven by the engine and both constituents of the charge being only mixed immediately before entering the cylinder. According to another feature of the invention with all load conditions the pressure of the gas may be controlled by the pressure in the compressor for the air for combustion. A further feature of the invention consists in the fact that the gas supply to the combustion cylinders occurs only when the scavenging action by the pre-compressed air for combustion is finished. The supply of gas to the cylinders of the combustion engine may be stopped before the supply of combustion air.

A constructional example of the subject matter of the present invention is illustrated on the accompanying drawings, in which:

Fig. 1 shows in a diagrammatic manner the connections between the gas motor, the air compressor driven by the exhaust turbine and the compressor for the gas;

Fig. 2 is a section through a valve casing in order to explain the scavenging and charging incidents, and Fig. 3 shows different pressure diagrams and valve-lift diagrams in dependency on the crank angle.

Fig. 4 is a plan view of a part of an internal combustion engine showing inlet and exhaust valves and operating mechanism.

Fig. 5 is a vertical sectional view of the upper part of an internal combustion engine illustrating the engine valves.

Fig. 6 is an enlarged detail view in section showing the gas pressure regulating mechanism.

The compressor 3 for the gas is driven from the crank shaft 2 of the gas engine 1 by means of gear wheels 4. Gas is supplied to the compressor 3 by the conduit 33 and is discharged into the common pressure conduit 6 and from there to the separate cylinders 17. A relief valve 35 permits the superfluous quantity of the compressed gas to return to the suction conduit through the pipe 34. The valve 35 is connected to a piston 5' by a rod 5 and is loaded in open position by a spring 5''. The valve 35 is influenced toward valve seat 36 by the air pressure in conduit 8 acting on piston 5' through conduit 7. The area of piston 5' upon which the air pressure is effective may be substantially greater than the effective area of valve 35, so that air at lower pressure than the gas may overcome the resistance of spring 5'' and hold valve 35 closed. When the air pressure decreases the valve 35 opens the relief cross-section by the action of the spring 5'' and causes thereby a decrease of the gas pressure in the conduit 6. With an increasing air pressure the valve 35 closes and the gas pressure increases.

The exhaust gases of the gas engine are supplied to the turbine 14 by the exhaust conduits 12 and 13. On leaving the turbine 14 they are discharged into the open through the conduit 15.

The air for combustion is supplied to the turbo compressor or rotary compressor 10 by the suction conduit 11 and is lead by the pressure pipe 7 to the different cylinders. On throwing the turbo compressor out of action the valves 16 for the exhaust and 9 for the suction air are opened.

The fresh gas is supplied by the channel 21 (Figs. 2 and 5) to the mixing sleeve valve 23 and the air by the channel 20. From the mixing space 24 the mixture of gas and air passes through the inlet valve 18 into the cylinder 25. The exhaust gases leave the cylinder through the exhaust valve 19 and the exhaust channel 22. During the scavenging period the inlet and exhaust valves are simultaneously open as is indicated in Fig. 5 and the mixing valve 23 is half open so that the access of gas from channel 21 is still closed whilst the air inlet from channel 20 is open. When the scavenging is finished the outlet valve closes and the mixing valve opens further to admit gas and air. Fig. 2 shows the valves in this position which corresponds to the suction period of the engine.

The mechanism for operating valves 18 and 19 and mixing sleeve valve 23 is of orthodox construction. For instance, mixing valve sleeve 23 and valve 18 may be operated by cams 33 and 47 mounted on rotating cam shaft, 48, and respectively acting on rollers 40 and 41 mounted in the ends of levers 49 and 37. The levers 49 and 37 are intermediately pivoted and the opposite ends from the rollers are connected respectively to mixing valve 23 and valve 18. Springs 38 and 39 hold the rollers 40 and 41 in contact with the cams. Valve 19 is operated by cam 44, roller 50, lever 45 and rod 51. Spring 46 presses valve 19 towards its seat by means of collar 52. Tension spring 39 operating through lever 37 biases valve 18 toward closed position.

Referring now to the diagrams illustrated in Fig. 3 in which the abscissæ are the crank angles and the ordinates the pressures or the lift of the valves respectively the chain-dotted line 27 indicates the constant pressure of the precompressed air and of the precompressed gas; the line 26 indicates the variation of the pressure in the cylinder during an exhaust and a suction stroke. The exhaust pressure in the exhaust conduits 12 and 13 varies as indicated by the line 28. During the period 32 the exhaust pressure 28 is smaller than the charging pressure 27. During this time the inlet and exhaust valves are simultaneously open and the scavenging of the combustion space takes place.

29 denotes the valve lift diagram for the exhaust valve, 30 for the air inlet valve and 31 for the gas inlet valve. The diagrams illustrate in which manner the open periods of the exhaust valve and of the air inlet valve overlap during the scavenging period and show that the inlet of the gas (31) is only opened at the end of the scavenging period and is closed before or simultaneously with the closing of the air supply.

The gas used may be of any kind suitable to be burnt, for instance, oil gas, coke oven gas, water gas, pintsch gas, blast furnace gas, natural gas or any mixture of combustible vapor and air or oxygen.

Obviously instead of the combined gas-air-inlet valve above described, a separate gas inlet valve may be provided.

I claim:

1. A prime mover, comprising a gas engine having cylinders, an exhaust turbine driven by the exhaust gases of said gas engine, exhaust piping for conveying the exhaust gas from the cylinders to the turbine, a compressor for compressing air for combustion and scavenging purposes and driven by said exhaust turbine, a rotary compressor for compressing the gas for charging purposes and driven by said engine, piping for conveying the compressed gas and compressed air separately to the combustion cylinders, a valve inserted in the exhaust piping between combustion cylinders and exhaust turbine, a valve inserted in the air pressure pipe between said air compressor and the combustion cylinders, pressure responsive means between the air pressure pipe and the gas pressure pipe to regulate the gas pressure in said gas pressure pipe in dependency of the pressure of the precompressed air for combustion and scavenging purposes by venting part of the gas, a mixing chamber to mix gas and air immediately before they enter the combustion cylinders, and means to interrupt the connection between said mixing chamber and the combustion cylinders.

2. A prime mover, comprising a gas engine having cylinders, an exhaust turbine driven by the exhaust gases of said gas engine, exhaust piping for conveying exhaust gases from the cylinders to the turbine, a compressor for compressing air for combustion and scavenging purposes and driven by said exhaust turbine, a rotary compressor for compressing the gas for charging purposes and driven by said gas engine, piping for conveying the compressed gas and compressed air separately to the combustion cylinders, a valve inserted in the exhaust piping between combustion cylinders and exhaust turbine, a valve inserted in the air pressure pipe between said air compressor and the combustion cylinders, pressure responsive means between the air pressure pipe and the gas pressure pipe in dependency of the pressure of the precompressed air for combustion and scavenging purposes for venting part of the gas and valve means for controlling the inlet of the compressed gas to the engine cylinders and valve means for controlling the inlet of the precompressed air to the engine cylinders, and valve operating and control mechanism to open the gas inlet valve after the scavenging of the cylinder is finished.

3. A prime mover, comprising a gas engine having cylinders, an exhaust turbine driven by the exhaust gases of said gas engine, exhaust piping for conveying exhaust gases from the cylinders to the exhaust turbine, a compressor for compressing air for combustion and scavenging purposes and driven by said exhaust turbine, a rotary compressor for compressing the gas for charging purposes and driven by said gas engine, piping for conveying the compressed gas and compressed air separately to the combustion cylinders, a valve inserted in the exhaust piping between combustion cylinders and exhaust turbine, a valve in the air pressure pipe between said air compressor and the combustion cylinders opening to the atmosphere, pressure responsive means between the air pressure pipe and the gas pressure pipe to regulate the gas pressure in said gas pressure pipe in dependency of the pressure of the precompressed air for combustion and scavenging purposes by venting part of the gas, valve means for controlling the flow of the precompressed gas to the engine cylinders, engine inlet valves for controlling the inlet of the precompressed air to the engine cylinders, and valve operating and controlling mechanism to close the engine inlet valves at the end of the inlet stroke.

4. A prime mover, comprising a gas engine having cylinders, an exhaust turbine driven by the exhaust gases of said gas engine, exhaust piping for conveying exhaust gases from the cylinders to the exhaust turbine, a compressor for compressing air for combustion and scavenging purposes and driven by said exhaust turbine, a rotary compressor for compressing the gas for charging purposes and driven by said gas engine, piping for conveying the compressed gas and compressed air separately to the combustion cylinders, a valve inserted in the exhaust piping between combustion cylinders and exhaust turbine, a valve inserted in the air pressure pipe between said air compressor and the combustion cylinders opening to the atmosphere, pressure responsive means between the air pressure pipe and the gas pressure pipe to regulate the gas pressure in the gas pressure pipe in dependency of the pressure of the precompressed air for combustion and scavenging purposes by venting part of the gas, a pipe between said pressure responsive means and the suction pipe of the gas compressor to lead the vented gas to the suction side of the gas compressor valve, means for controlling the flow of the compressed gas to the engine cylinders, engine inlet valves for controlling the inlet of the precompressed air to the engine cylinders, and valve operating and controlling mechanism to close the engine inlet valves at the end of the inlet stroke.

5. A prime mover, comprising a gas engine having cylinders, an exhaust turbine driven by the exhaust gases of said gas engine, exhaust piping to convey the exhaust gas from the cylinders to the exhaust turbine, a compressor for compressing air for combustion and scavenging purposes and driven by said exhaust turbine, a rotary compressor for compressing the gas for charging purposes and driven by said gas engine, piping for conveying the compressed gas and compressed air separately to the combustion cylinders, a valve inserted in the exhaust piping between combustion cylinders and exhaust turbine, a valve inserted in the air pressure pipe between said air compressor and the combustion cylinders and opening to the atmosphere, pressure responsive means between the air pressure pipe and the gas pressure pipe to keep the pressure of the precompressed gas higher than the pressure of the air for combustion and scavenging purposes by by-passing part of the precompressed gas, valve means for controlling the inlet of the compressed gas to the engine cylinders, engine inlet valves for controlling the flow of the precompressed air to the engine cylinder, and valve operating and controlling mechanism to close the engine inlet valves at the end of the inlet stroke.

6. A prime mover comprising a gas engine having cylinders, an exhaust turbine driven by the exhaust gases of said gas engine, exhaust piping to convey exhaust gases from the cylinders to the exhaust turbine, a compressor for compressing air for combustion and scavenging purposes and driven by said exhaust turbine, a rotary compressor for compressing the gas for charging purposes and driven by said gas engine, piping for conveying the compressed gas and compressed air separately to the combustion cylinders, a valve inserted in the exhaust piping between combustion cylinders and exhaust turbine, pressure responsive means between the air pressure pipe and the gas pressure pipe to regulate the gas pressure in said gas pressure pipe in dependency of the pressure of the precompressed air for combustion and scavenging purposes, a valve inserted in the air pressure pipe between said air compressor and the combustion cylinders, valve means for controlling the flow of the compressed gas to the engine cylinders, valve means for controlling the inlet of the precompressed air to the engine cylinder, and valve operating and controlling mechanism to close the engine inlet valves at the end of the inlet stroke.

In testimony whereof I have signed my name to this specification.

ALFRED BÜCHI.